(12) United States Patent
Serkh

(10) Patent No.: US 7,597,639 B2
(45) Date of Patent: Oct. 6, 2009

(54) BELT TENSIONER

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/664,443

(22) Filed: Sep. 19, 2003

(65) Prior Publication Data

US 2004/0102271 A1   May 27, 2004

Related U.S. Application Data

(60) Provisional application No. 60/412,471, filed on Sep. 20, 2002.

(51) Int. Cl.
*F16H 7/08*  (2006.01)
(52) U.S. Cl. .................................... 474/109
(58) Field of Classification Search ............... 474/101, 474/109, 111, 113, 117, 118, 136; 267/286, 267/288, 34, 73
See application file for complete search history.

(56) References Cited

U.S. PATENT DOCUMENTS

| | | | |
|---|---|---|---|
| 4,416,647 A | 11/1983 | White, Jr. ............... | 474/134 |
| 4,530,682 A * | 7/1985 | Gruber et al. ............ | 474/133 |
| 4,606,442 A | 8/1986 | Paton et al. ............. | 188/381 |
| 4,713,044 A | 12/1987 | Nakamura et al. ........ | 474/135 |
| 4,822,321 A | 4/1989 | Webb ..................... | 474/117 |
| 4,938,735 A | 7/1990 | Mitchell et al. .......... | 474/133 |
| 4,973,290 A | 11/1990 | Hans et al. .............. | 474/117 |
| 4,976,661 A | 12/1990 | Ojima ..................... | 474/138 |
| 5,439,420 A | 8/1995 | Meckstroth et al. ...... | 474/133 |
| 5,480,358 A | 1/1996 | Sakai et al. ............. | 474/117 |
| 5,669,841 A | 9/1997 | Schick ................... | 474/135 |
| 5,785,619 A | 7/1998 | Nakakubo et al. ........ | 474/109 |
| 5,951,423 A | 9/1999 | Simpson ................ | 474/109 |
| 6,039,664 A | 3/2000 | Schmid ................... | 474/135 |
| 6,398,681 B1 * | 6/2002 | Wanie ..................... | 474/101 |
| 6,612,408 B2 * | 9/2003 | Serkh et al. ............. | 188/129 |
| 6,702,266 B1 * | 3/2004 | Dec ......................... | 267/205 |
| 2002/0025869 A1 | 2/2002 | Serkh et al. ............. | 474/135 |
| 2003/0051956 A1 | 3/2003 | Serkh et al. ............. | 188/322.14 |

FOREIGN PATENT DOCUMENTS

DE    3809169 A1 * 10/1988

* cited by examiner

*Primary Examiner*—Vicky A Johnson
(74) *Attorney, Agent, or Firm*—J. L. Mahurin, Esq.; J. A. Thurnau, Esq.; P. N. Dunlap, Esq.

(57) ABSTRACT

The invention is an improved tensioner for tensioning a power transmission belt. It is of the type having a pulley adapted to communicate with a surface of a power transmission belt, an arm supporting the pulley upon which the pulley is rotatably mounted via a pulley bearing, and having a shaft supporting the arm. The shaft is rotatably supported by a pivot bearing. Further, it is of the type having an attachment point for a strut with the strut attached to the attachment point. It is improved by the pulley and the attachment point being laterally offset in relation to the pivot bearing and substantially balanced in terms of parasitic torque across the pivot bearing.

16 Claims, 5 Drawing Sheets

BELT TENSIONER

CROSS-REFERENCE TO RELATED APPLICATIONS

This application claims priority to U.S. Provisional Patent Application Ser. No. 60/412,471, filed Sep. 20, 2002 and entitled Belt Tensioner. The subject matter of this application is incorporated herein by this reference.

BACKGROUND OF THE INVENTION

1. Field of the Invention

This invention relates generally to a tensioner for tensioning a belt of a power transmission belt drive system. More particularly, it relates to a tensioner having arcuate movement and a strut as the biasing or bias-modifying member. Specifically, this invention relates to a tensioner having a geometry that reduces imbalances across a pivot at the center of the arcuate movement.

2. Description of the Prior Art

Power transmission belt tensioners used in conjunction with power transmission accessory belt drive systems for internal combustion engines are known with pulley movements that are arcuate and include a strut for biasing or modifying the bias of the pulley which rests against the belt and thus controls tension of the belt drive of the system. Commonly, the pulley, the pivot about which the body of the tensioner rotates in operation and the attachment point of the strut are all coplanar. An example of this coplanar arrangement can be found in U.S. Pat. No. 5,439,420, to Meckstroth, et al.

However, certain geometries of power transmission accessory belt systems do not lend themselves to this coplanar configuration. When such a geometry is present and it is desired to use a tensioner employing a strut, it becomes necessary to laterally offset the pulley in relation to the pivot to provide the needed clearances. An example where the pulley is offset in this manner can be found in U.S. Pat. No. 6,039,664, to Schmid. It can be seen in the '664 patent that the plane at the center of rotation of the pulley, or the plane that bisects the pulley, is offset from the plane of rotation at the center of the pivot bearing. Still, the attachment point for the strut remains substantially in the plane at the center of rotation of the pivot bearing. It is readily apparent that, when the subject tensioner is placed into operation, the forces acting upon the tensioner by the belt and the strut give rise to an unbalanced load across the pivot bearing. This would be true whether the strut is providing the biasing force for the tensioner or only modifying the biasing force through damping. An unbalanced load causes parasitic torque, which tends to force the pivot shaft to axially misalign with the bearing. Such parasitic torque in combination with normal rotational movement tends to cause uneven wear in bearings. If uneven wear is allowed to progress, a bearing will exhibit undesirable properties such a looseness, noise, misalignment, and failure.

Accordingly, there is a continuing need for an arcuate movement tensioner utilizing the beneficial properties of a strut biasing member and offset to accommodate certain power transmission accessory belt drive system geometries that operates without substantial parasitic torque for improved bearing life properties.

SUMMARY OF THE INVENTION

An arcuate, strut type, power transmission belt tensioner with a laterally offset pulley which operates with minimized parasitic torque is disclosed. The invention is an improved tensioner for tensioning a power transmission belt. It is of the type having a pulley adapted to communicate with a surface of a power transmission belt, an arm supporting the pulley upon which the pulley is rotatably mounted via a pulley bearing, and having a shaft supporting the arm. The shaft is rotatably supported by a pivot bearing. Further, it is of the type having an attachment point for a strut with the strut attached to the attachment point. It is improved by the pulley and the attachment point being laterally offset in relation to the pivot bearing and substantially balanced in terms of parasitic torque across the pivot bearing.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
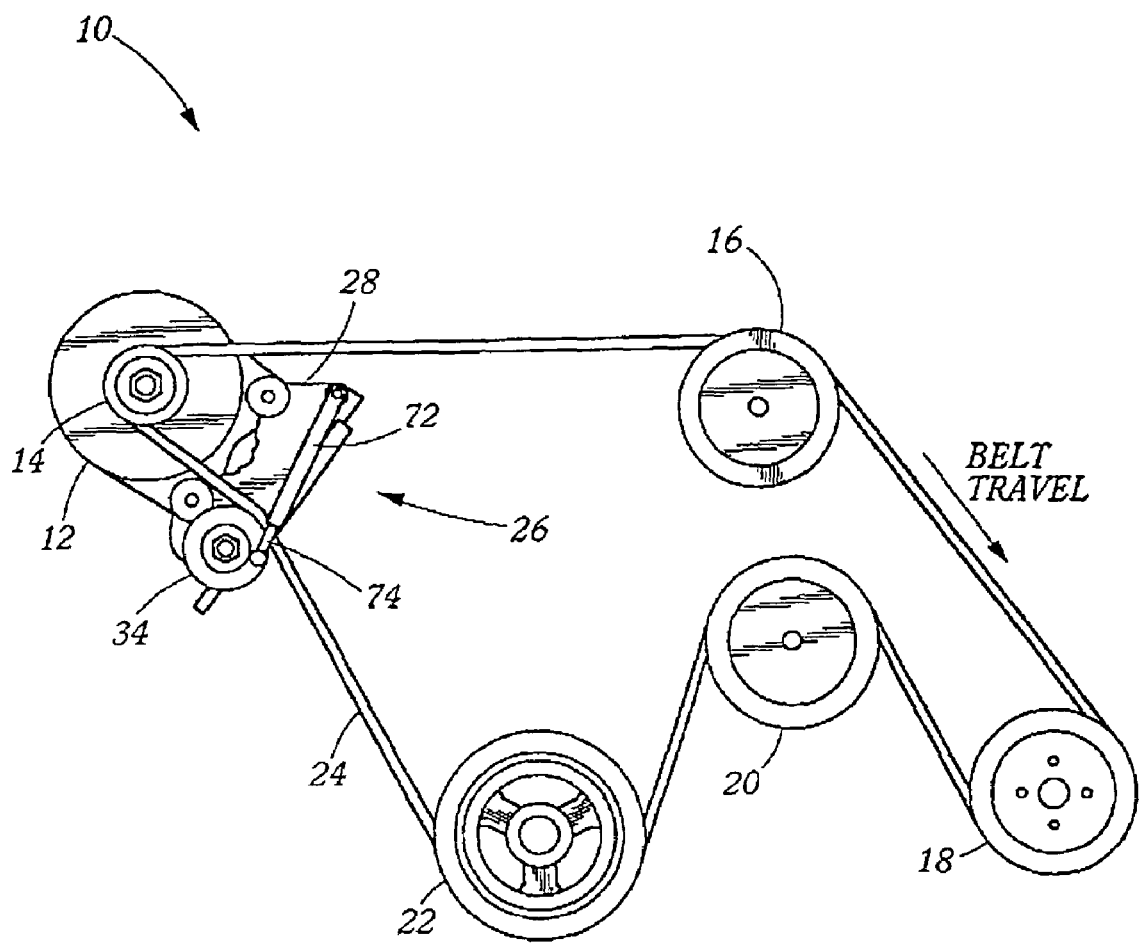
FIG. 1 is a schematic representation of a preferred embodiment of a tensioner in a power transmission accessory belt drive system.

FIG. 1 depicts a typical accessory drive system 10 for an automotive internal combustion engine in which tensioner 26 of the instant invention can be employed. However, its application is not limited to automotive use. Rather, it can be applied to any internal combustion engine, having a power transmission belt drive for communicating power, that would benefit from the inclusion of the tensioner 26 of the instant invention. System 10 includes alternator 12, alternator pulley 14, power steering pump pulley 18, water pump pulley 20, crankshaft pulley 22, power transmission belt 24, and tensioner 26. Alternator 12 is mounted upon base 28, which forms part of tensioner 26. The embodiments depicted in the figures include base 28 adapted to mount upon an engine (not depicted) and having mounting points for supporting an alternator 12 or other accessory. However, base 28, without mounting points for supporting alternator 12 or other accessory, is also contemplated.

Figure 2:
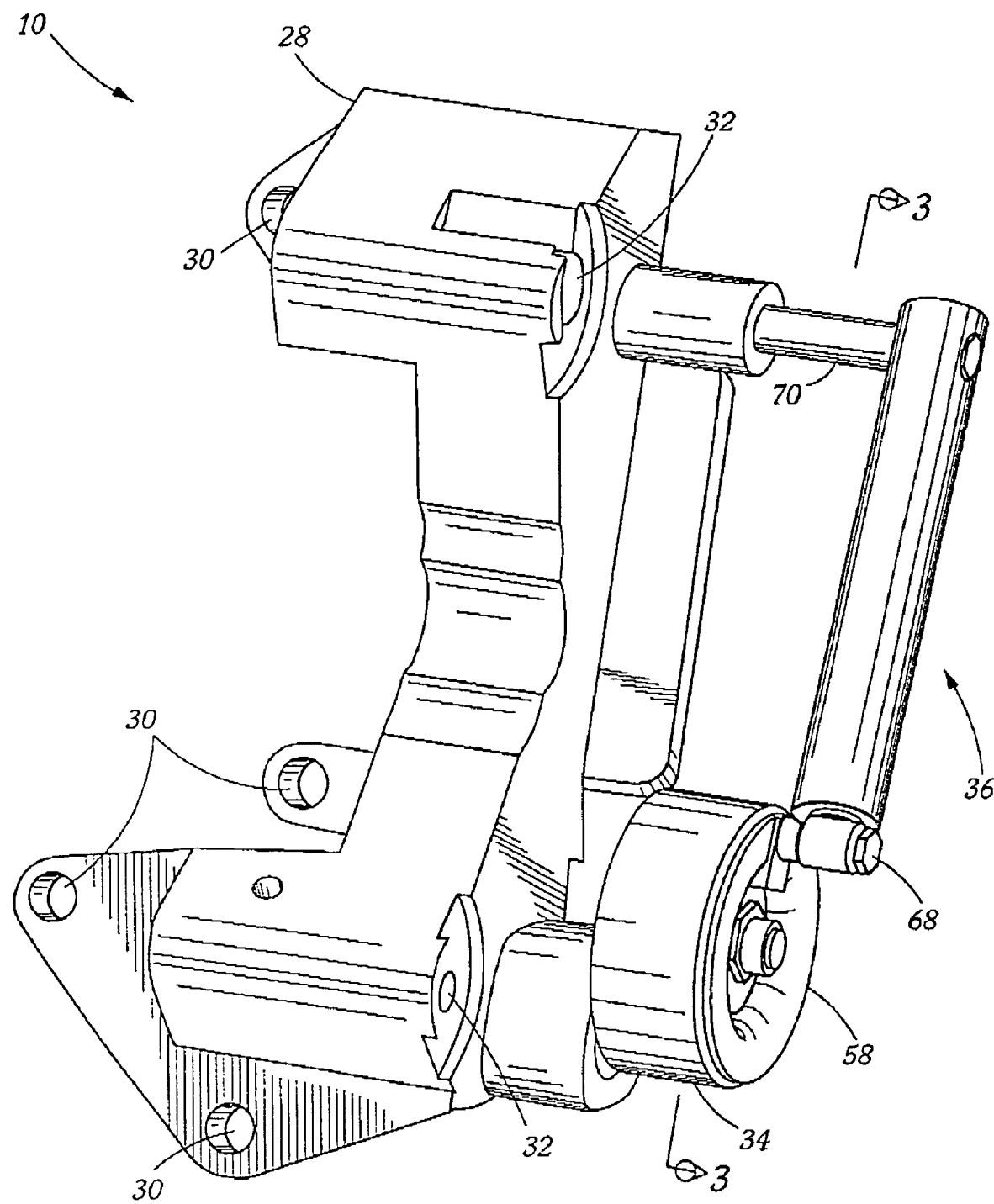
FIG. 2 is a perspective view of a preferred embodiment of a tensioner.
Figure 3:
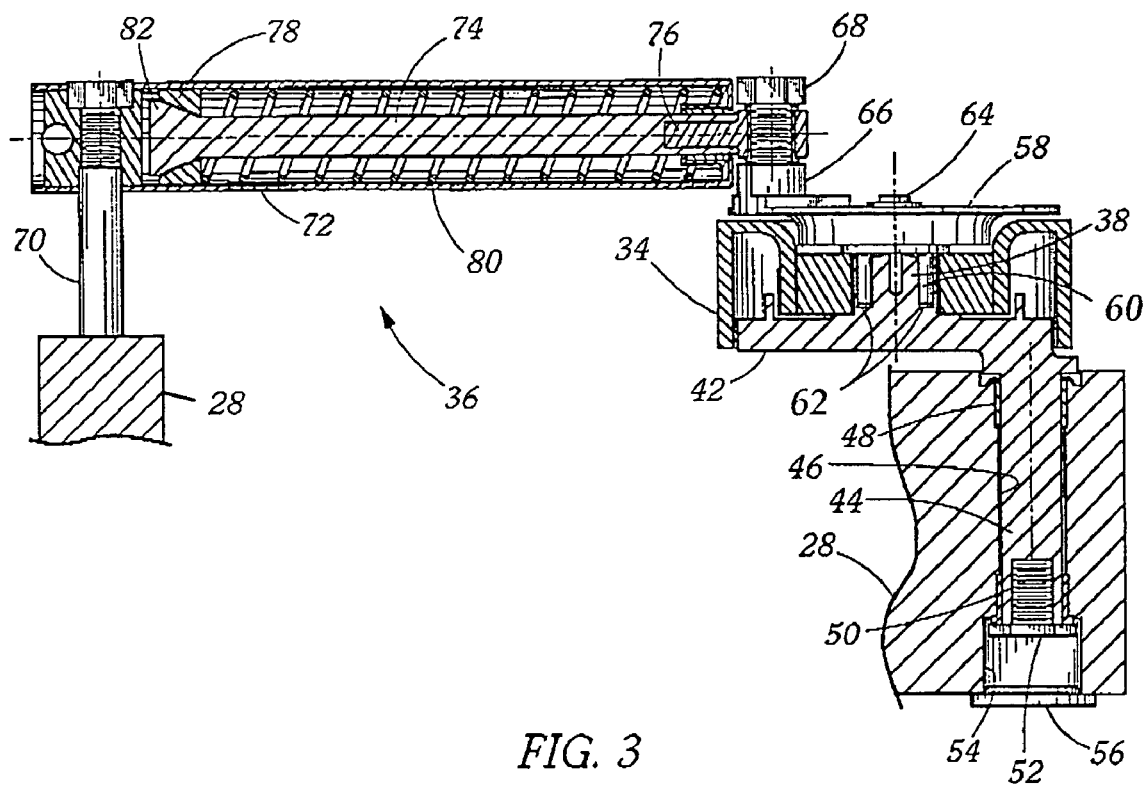
FIG. 3 is a section taken along the line 3-3 in FIG. 2.

Additional detail can be viewed in FIGS. 2 and 3. Base 28 includes engine mounting holes 30 and accessory mounting holes 32. Base 28 further supports tensioner pulley 34, and strut 36. Specifically, tensioner pulley 34 is rotatably mounted upon pulley post 38 via pulley bearing 40. Pulley post 38 extends from pulley arm 42. Pulley arm 42 extends from pivot shaft 44. Pivot shaft 44 is rotatably placed within pivot hole 46 and supported by a bearing comprising first and second pivot bearings 48 and 50. Pivot shaft 44 is trapped within pivot hole 46 by pivot screw 52. The head of pivot screw 52 is concealed within recess 54 by cap 56. A portion of tensioner pulley 34 and pulley bearing 40 is covered by dust shield 58. Dust shield 58 includes shield posts 60, which cooperate with post holes 62 to prevent dust shield 58 from rotating relative to pulley arm 42. Dust shield 58 is affixed to pulley post 38 by pulley screw 64. Dust shield 58 includes threaded standoff 66. A first end of strut 36 is rotatably connected to dust shield 58 by first strut connector 68 being threaded into threaded standoff 66. A second end of strut 36 is rotatably connected to base 28 by second strut connector 70 being threaded into base 28. It is contemplated that strut connector 70 could alternatively be threaded into a member stationary in relation to the engine, but not part of base 28.

Strut 36, of this embodiment, is of the mechanical type and provides a damped biasing of tensioner pulley 34. Strut 36 includes cylinder 72, plunger 74, plunger connector 76, damping ring 78, and compression spring 80. Overall, strut 36 operates in tension between base 28 and tensioner pulley 34. Even though, it uses a compression spring. Compression spring 80 forces damping ring 78 deeper into cylinder 72, which pulls plunger 74 deeper into cylinder 72, shortening the overall length of strut 36. Accordingly, the force of compression spring 80 tending to shorten strut 36 tends to pull tensioner pulley 34 against power transmission belt 24 and place power transmission belt 24 under tension.

Damping is effected by frictional mating of the outside surface of damping ring 78 with the inside surface of cylinder 72. Further, the damping characteristics are asymmetrical due to the expanding relationship of frustoconical portion 82 of plunger 74 with the interior surface of damping ring 78. As strut 36 is forced to extend because tensioner pulley 34 is being moved by operation of power transmission belt 24, the expanding relationship forces damping ring 78 toward expansion. This causes the force exhibited between the outside surface of damping ring 78 with the inside surface of cylinder 72 to increase with a corresponding increase in frictional damping. By contrast, when strut 36 is allowed to contract by operation of power transmission belt 24, the expanding relationship allows less force upon damping ring 78. This causes the force exhibited between the outside surface of damping ring 78 with the inside surface of cylinder 72 to decrease with a corresponding decrease in frictional damping. Ultimately, frictional damping when tensioner pulley 34 is moving in the belt loosening direction is greater than when moving in the belt tightening direction.

It is contemplated that a variety of strut configurations can be used. Use of mechanical or hydraulic struts also operating under tension, but with different internal details are contemplated. A change in the configuration of base 28 can rotate strut 36 180° about first strut connecter 68 so that it extends on the other side. In such case, a strut operating under compression would be required. A strut with symmetrical damping or without damping may also be appropriate. Further, for tensioners where biasing is provided by another mechanism, it would be appropriate to use a strut with only damping characteristics.

Figure 4:
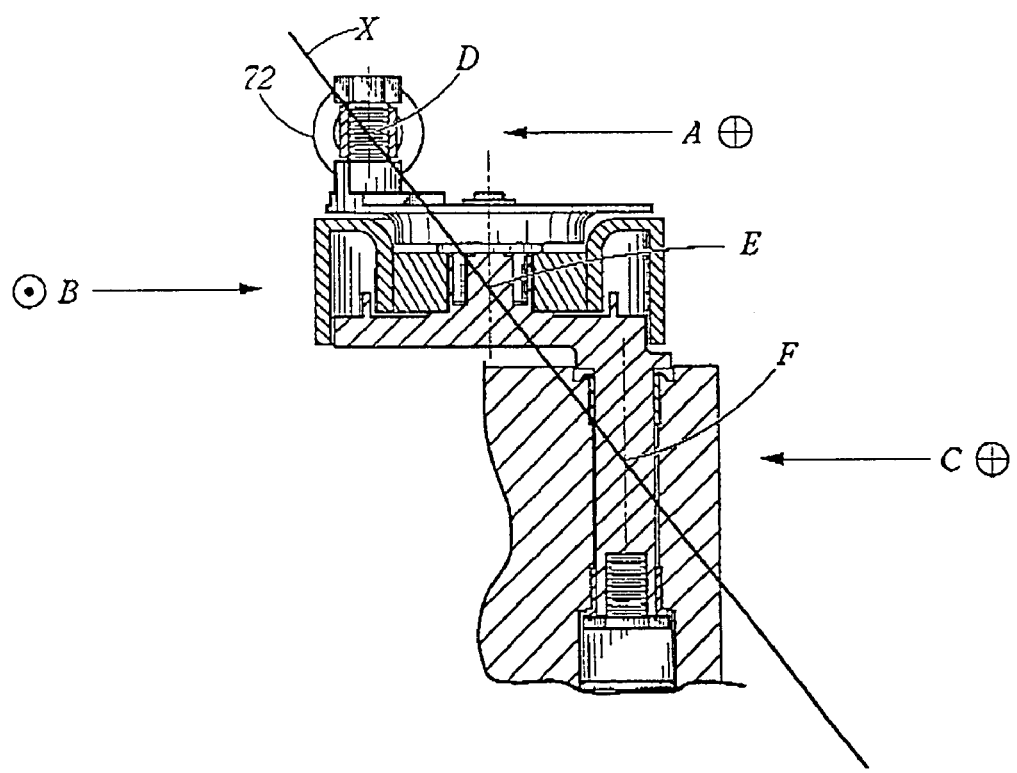
FIG. 4 is a detail of FIG. 3.

The following refers to FIGS. 3 and 4, where FIG. 4 is looking upon the right end of FIG. 3. During operation of accessory belt drive system 10, there are three forces, of varying magnitudes, of primary concern regarding the function of tensioner 26: biasing force A, the force produced by strut 36, depicted in FIG. 4 as penetrating the page at point D; belt force B, the force produced by belt 24 pressing upon tensioner pulley 34, depicted as exiting the page at point E; and, base force C, the force provided by action of base 28 through pivot bearings 48 and 50 upon pivot shaft 44, depicted as penetrating the page at point C. They are significant in terms of their affect upon loading of first and second pivot bearings 48 and 50. As discussed above under "Description of the Prior Art", certain belt drive systems have geometries that do not allow the use of a strut type tensioner where the attachment point for the strut, the plane at the center of rotation of the tensioner pulley and the plane at the center of rotation of the pivot can be coplanar.

For such geometries, the system must either forego the advantages provided by a strut or offset the tensioner pulley out of line with the center of the plane of rotation of the pivot. An uncompensated offset places torque upon the pivot that is not about the axis of the pivot. This parasitic torque causes a tendency for the axis of the pivot shaft, such as pivot shaft 44 of the current embodiment, to move out of alignment with the axis of the pivot hole, such as the pivot hole 46 of the current embodiment. This tendency leads to differing or unbalanced loads upon the pivot bearings, such as first and second pivot bearings 48 and 50.

As accessory belt drive system 10 operates, tensioner pulley 34 is subject to continuous movement, causing pivot shaft 44 to rotate continuously within first and second pivot bearings 48 and 50 in a largely oscillatory manner. This continuous movement coupled with parasitic torque leads to differential wear among the pivot bearings such as first and second pivot bearings 48 and 50. If allowed to progress, the wear upon the first pivot bearing will tend to be on one side, in relation to the base comparable to base 28. While, the wear on the second pivot bearing will tend to be on the other side. This unbalanced wear allows the axis of the pivot shaft such as pivot shaft 44 to be misaligned with the axis of the pivot hole such as pivot hole 46 and the fit to become loose and noisy. Further, the tensioner pulley such as tensioner pulley 34 will become cocked such that its plane of rotation becomes misaligned with the line of travel of power transmission belt 24. These are very undesirable conditions warranting replacement of the tensioner.

The configuration of the current embodiment of tensioner 26 is substantially balanced in that the forces A, B, and, C do not give rise to parasitic torque across the pivot comprising pivot shaft 44, pivot hole 46 and first and second pivot bearings 48 and 50. As can be seen, whatever the magnitude of belt force B (within reasonable operating parameters) the resulting combination of biasing force A with base force C will be of equal and opposite direction. This is true regardless of the lateral displacements (i.e., along the axis of pivot shaft 44), of each of the forces. If the lateral distance of biasing force A from belt force B is greater the distance of base force C from belt force B, then biasing force A will be less than base force C by the inverse of the ratio of the two distances. However, the ratio of the moment arms associated with each distance from belt force B will vary directly with the ratio of the two distances with a canceling effect. Likewise, this will be true regardless of radial displacement from the axis of pivot shaft 44.

In FIG. 4 you will find the conceptual balance line X. It is defined by points D and E. Point D is the intersection of biasing force A with the axis of first strut connector 68. Point E is the intersection of belt force B with the axis of rotation of tensioner pulley 34 and the plane at the center of rotation of tensioner pulley 34. Balance line X extends on to point F. Point F is the balance line X intersection with the axis of pivot shaft 44. It is this last intersection, point F, that determines the effective point where base force C concentrates upon pivot shaft 44.

In FIG. 4, point F is depicted to be at the midpoint between first and second pivot bearings 48 and 50. As can be seen, when base force C is applied at this midpoint, base force C is distributed evenly in both direction and magnitude at each of first and second pivot bearings 48 and 50. This even distribution eliminates parasitic torque and the uneven wear attendant thereto. By contrast, if point F were beyond the lateral limits of either first or second pivot bearings 48 or 50, as a result of different locations of points D and E, then parasitic torque would be generated. The resulting distribution of base force C would be in opposite directions at each pivot bearing 48 and 50.

Several dimensions can affect the location of point F. The length of first strut connector 68, the radial distance of threaded standoff 66 from the axis of pivot shaft 44, the amount of offset of tensioner pulley 34, the radial distance of the axis of tensioner pulley 34 from the axis of pivot shaft 44, and the distance between first and second pivot bearings 48 and 50. Ideally, the mixture of these dimensions is adjusted to place point F as depicted (i.e., regardless of how far points D or E are moved laterally and moved radially from the axis of pivot shaft 44, they are dimensioned to lie upon balance line X). However, it can be seen that so long as point F lies between the extreme lateral limits of first and second pivot bearings 48 and 50, then the direction of the distribution of base force C at each of first and second pivot bearings 48 and 50 will both remain the same and tensioner 26 is substantially balanced. Accordingly, there will still be no parasitic torque. While, in this configuration, wear may then occur faster at either first or second pivot bearing 48 or 50, the wear will occur on the same portions of each. This will still act to prolong the time before excessive looseness or noise appears in the first and second pivot bearings 48 and 50 and before tensioner pulley 34 would become excessively misaligned with the running direction of belt 24.

Figure 5:
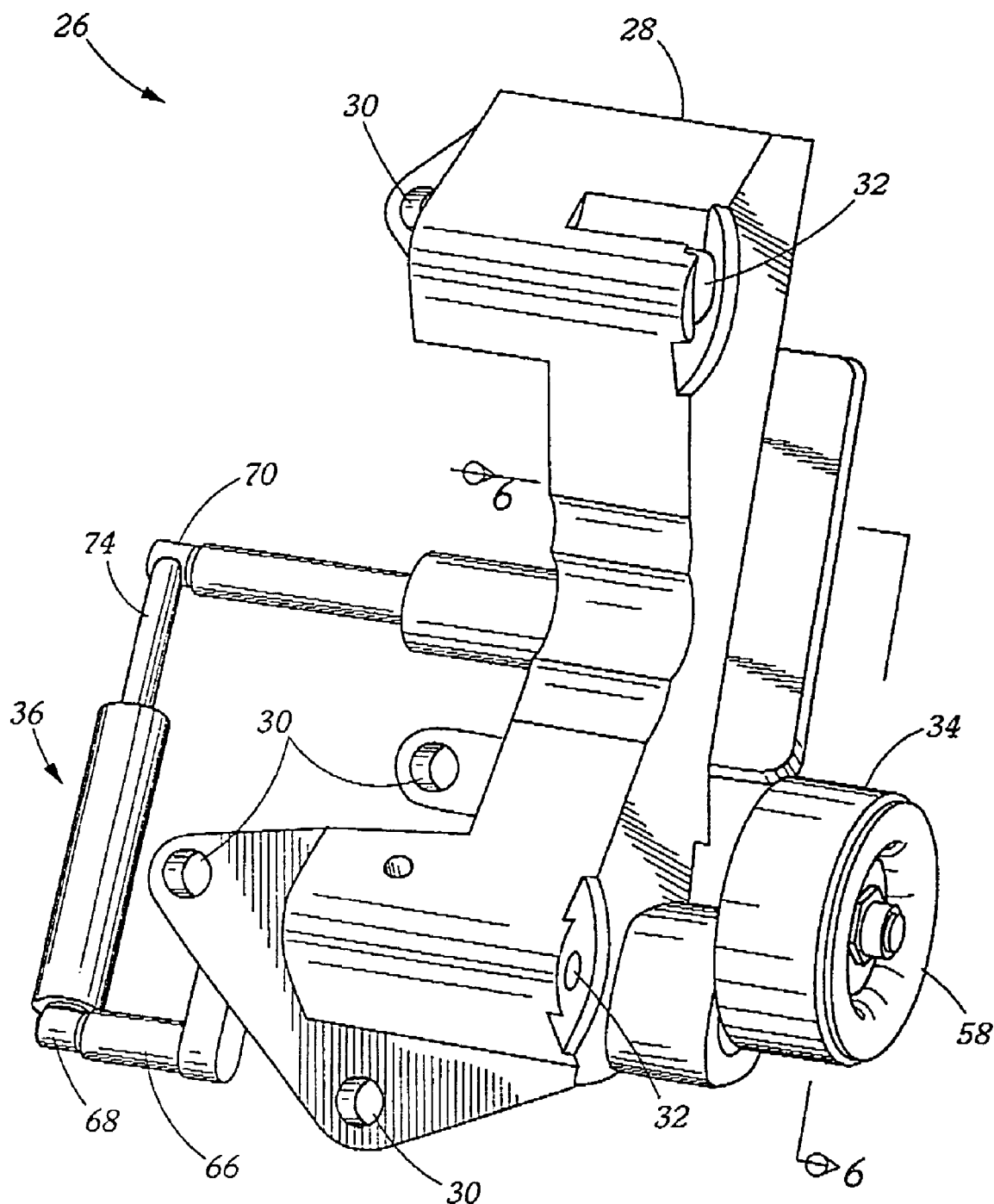
FIG. 5 is a perspective view of a preferred embodiment of a tensioner.
Figure 6:
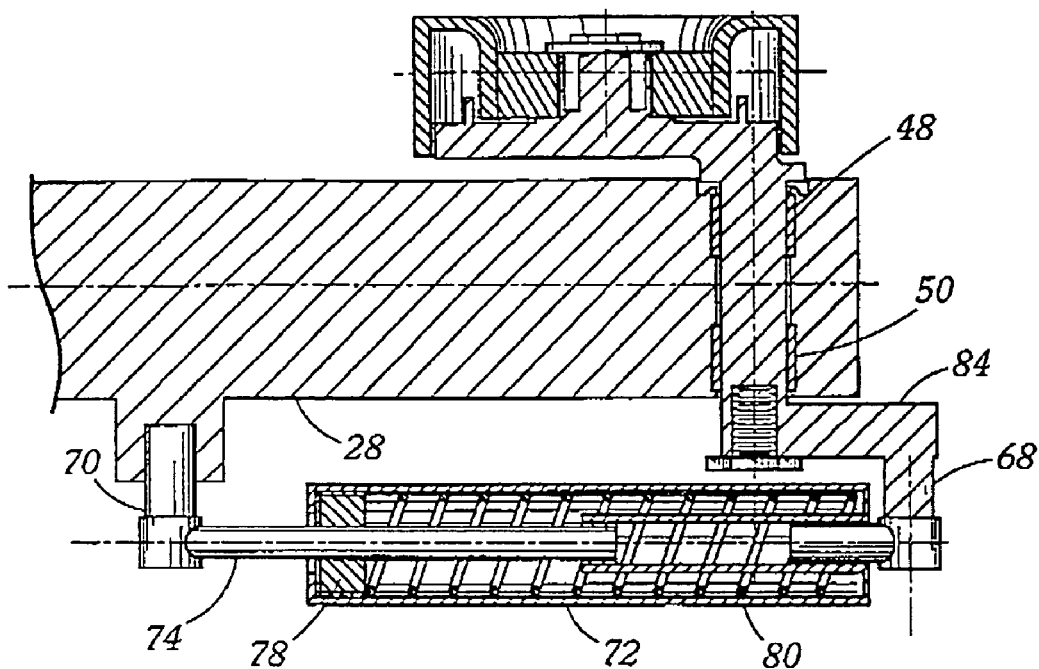
FIG. 6 is a section taken along line 6-6 in FIG. 5.
Figure 7:
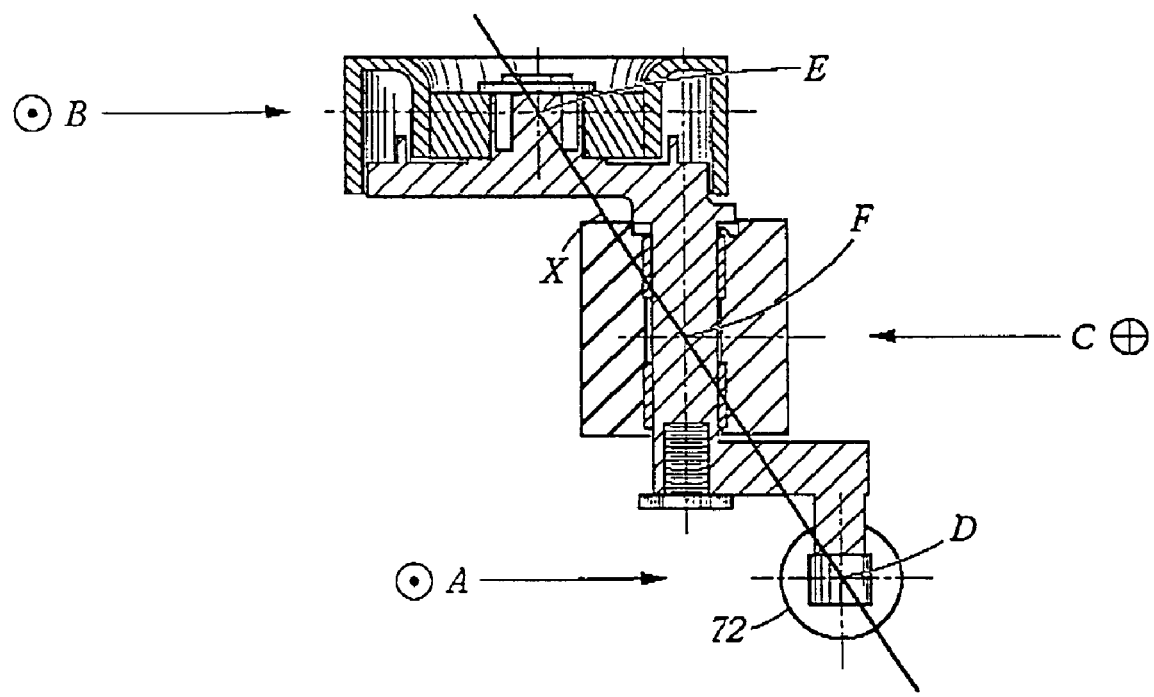
FIG. 7 is a detail of FIG. 6.

FIGS. 5, 6 and 7 depict another embodiment utilizing the same principle of controlling the location of point F to eliminate parasitic torque about the pivot comprising pivot shaft 44, pivot hole 46, first pivot bearing 48 and second pivot bearing 50. FIG. 7 is looking upon the right end of FIG. 6. Here the connection point for strut 36 has been moved from dust shield 58 to strut arm 84, on the laterally and radially opposite side of the pivot. This necessitates the use of a strut 36 that operates in compression instead on in tension, as depicted. Strut 36 of this embodiment is a simplified strut as compared to the previous embodiment. It provides only symmetrical damping by friction supplied by the contact of the inner surface of cylinder 72 with the outer surface of damping ring 78. This is due to damping ring 78 being affixed to plunger 74 and thus having no action comparable to the interaction of damping ring 78 with frustoconical portion 82 of the prior embodiment. However, as with the prior embodiment, any of a wide variety of struts can be utilized to provide the required bias for tensioner 26.

In this embodiment, balance line X is also defined by the points D and E. Point F is the point of intersection of balance line X with the axis of pivot shaft 44. Similar to the prior embodiment, several dimensions can affect the location of point F. The length of first strut connector 68, the radial distance of strut arm 84 from the axis of pivot shaft 44, the amount of offset of tensioner pulley 34, and the radial distance of the axis of tensioner pulley 34 from the axis of shaft 44. Ideally, the mixture of these dimensions is adjusted to place point F as depicted, at the midpoint between first and second pivot bearings 48 and 50. However, it can be seen that so long as point F lies between the extreme lateral limits of first and second pivot bearings 48 and 50, then the direction of the distribution of base force C at each of first and second pivot bearings 48 and 50 will both remain the same. Accordingly, there will still be no parasitic torque. While, in this configuration, wear may then occur faster at either first or second pivot bearing 48 or 50, the wear will occur on the same portions of each.

The instant invention allows the use of a strut type tensioner, where the tensioner pulley has been offset to accommodate certain belt drive accessory systems, without the hereto-fore disadvantage of uneven and excessive pivot bearing wear. Accordingly, improved life of the bearings, without excessive wear that would allow excessive looseness, and angulation of the tensioner pulley or excessive noise, is provided.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

I claim:

1. An improved power transmission belt tensioner having a pulley adapted to communicate with a surface of a power transmission belt, an arm supporting said pulley upon which said pulley is rotatably mounted via a pulley bearing, a shaft supporting said arm, said shaft rotatably supported by a pivot bearing, an attachment point for a strut, and said strut attached to said attachment point, the improvement comprising:

said strut attachment point is laterally opposite of said pivot bearing in relation to the plane of rotation of said pulley;

said strut attachment point forming part of a shield extending from a support for said pulley bearing; and said pulley and said attachment point laterally offset in relation to said pivot bearing such that a balance line passing through an axis of said attachment point and a center of said pulley intersects said shaft within a lateral limit of said pivot bearing, thereby substantially balancing said tensioner in terms of parasitic torque across said pivot bearing.

2. The improvement of claim 1 wherein, said strut attachment point is laterally opposite of said pulley in relation to the plane of rotation of said pivot bearing.

3. The improvement of claim 2 wherein, said strut attachment point is beyond the lateral limits of said pivot bearing.

4. The improvement of claim 2 wherein, said strut attachment point forms part of a member extending from said shaft.

5. The improvement of claim 4 wherein, said member is a lever arm.

6. The improvement of claim 2 wherein, the plane of rotation of said pulley is beyond the lateral limits of said pivot bearing.

7. The improvement of claim 2 wherein, said pulley is radially opposite of said attachment point in relation to said pivot bearing.

8. The improvement of claim 1 wherein said tensioner includes a base adapted to support an accessory.

9. A power transmission drive comprising:

a crankshaft pulley;

an accessory pulley;

a power transmission belt;

a power transmission belt tensioner having a tensioner pulley adapted to communicate with a surface of said power transmission belt, en arm supporting said tensioner pulley upon which said tensioner pulley is rotatably mounted via a pulley bearing, a shaft supporting said arm, said shaft rotatably supported by a pivot bearing, an attachment point for a strut, and said strut attached to said attachment point, said strut attachment point being laterally opposite of said pivot bearing in relation to the plane of rotation of said tensioner pulley, said strut attachment point forms part of a shield extending from a support for said pulley bearing, and said pulley and said attachment point laterally offset in relation to said pivot bearing such that a balance line passing through an axis of said attachment point and a center of said pulley intersects said shaft within a lateral limit of said pivot bearing, thereby substantially balancing said tensioner in terms of parasitic torque across said pivot bearing; and, said power transmission belt trained about said crankshaft pulley, said accessory pulley and said tensioner pulley.

10. The power transmission drive of claim 9 further comprising, said strut attachment point being laterally opposite of said pulley in relation to the plane of rotation of said pivot bearing.

11. The power transmission drive of claim 10 further comprising said strut attachment point being beyond the lateral limits of said pivot bearing.

12. The power transmission drive of claim 10 further comprising, said strut attachment point forms part of a member extending from said shaft.

13. The power transmission drive of claim 12 further comprising, said member being a lever arm.

14. The power transmission drive of claim 10 further comprising the plane of rotation of said pulley being beyond the lateral limits of said pivot bearing.

15. The power transmission drive of claim 9 wherein said power transmission tensioner includes a base adapted to support an accessory.

16. A method of tensioning a power transmission belt comprising:

providing said power transmission belt, providing a pivot bearing providing a tensioner having a pulley adapted to communicate with a surface of said power transmission belt a supporting structure including a supporting shaft rotatably supported by said pivot bearing for supporting a supporting arm, said supporting arm for supporting said pulley, said pulley being rotatably mounted upon said supporting arm via a pulley bearing, said pulley being laterally offset in relation to said pivot bearing, and an attachment point for a strut, said attachment point for said strut forming part of a shield extending from a support for said pulley bearing, and said attachment point being laterally offset in relation to said pivot bearing, such that a balance line passing through an axis of said attachment point and a center of said pulley intersects said shaft within a lateral limit of said pivot bearing, communicating a biasing force from said strut to said attachment point, said supporting structure communicating said biasing force to said pulley through rotation about said pivot bearing, and substantially balancing said biasing force at said pivot bearing in terms of parasitic torque.

* * * * *